United States Patent Office 3,124,584
Patented Mar. 10, 1964

3,124,584
PROCESS FOR THE PRODUCTION OF HETEROCYCLIC METHYLENE COMPOUNDS
Oskar Weissel, Krefeld-Uerdingen, Germany, assignor to Farbenfabriken Bayer Aktiengesellschaft, Leverkusen, Germany, a corporation of Germany
No Drawing. Filed Feb. 7, 1961, Ser. No. 87,552
Claims priority, application Germany Feb. 11, 1960
3 Claims. (Cl. 260—283)

It is known to produce monoacyl derivatives of heterocyclic methylene bases by reacting acylating agents with such methylene bases, optionally in the presence of other acid-binding substances (Angewandte Chemie, 61, 11–17, French Patent No. 1,195,933).

However, it is not possible to produce diacyl derivatives of these bases in this way, since the reactivity of the monoacylated methylene group is strongly reduced compared with that of the unsubstituted methylene group (French Patent No. 1,196,196).

It has now been found that diacyl derivatives of heterocyclic methylene bases of the general Formula I

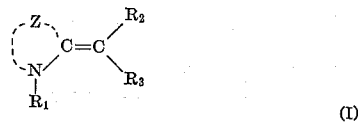

(I)

wherein $R_1$ denotes an unbranched or branched alkyl radical with up to 8 carbon atoms, $R_2$ and $R_3$ each denote a radical selected from the group consisting of the cyano, acetyl, propionyl, butyryl or isobutyryl, benzoyl, methoxycarbonyl, ethoxycarbonyl and phenoxycarbonyl radicals represented by the formulae —CN, —COCH$_3$, —COC$_2$H$_5$, —COC$_3$H$_7$,

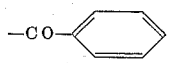

—COOCH$_3$, —COOC$_2$H$_5$ and

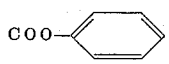

and Z represents the radicals required to complete an indoline or quinoline ring system, can be easily produced by reacting monoacyl derivatives of heterocyclic methylene bases of the Formula II

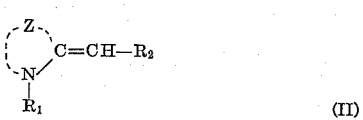

(II)

wherein $R_1$, $R_2$ and Z have the same significance as in the foregoing Formula I, with acylating agents selected from the group consisting of cyanogen chloride, acetic, propionic, butyric, isobutyric and benzoic acid anhydrides and chlorides, and the methyl, ethyl and phenyl esters of chlorocarbonic acid, in the presence of catalysts that promote the Friedel-Crafts reaction and, if desired, in the presence of solvents.

Thus, for example, the hitherto unknown 1,3,3-trimethyl-2-dicyanomethylene-indoline of the Formula III

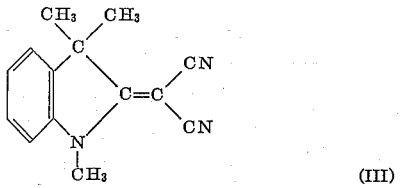

(III)

is obtained according to the invention by reacting 1,3,3-trimethyl-2-cyanomethylene-indoline with cyanogen chloride in the presence of aluminum chloride.

Other suitable monoacyl derivatives of heterocyclic methylene bases having the above stated Formula II are, for example:

1,3,3-trimethyl-5-methoxy-2-cyanomethylene-indoline,
1,3,3,5-tetramethyl-2-cyanomethylene-indoline,
1,3,3,4,5,7-hexamethyl-2-cyanomethylene-indoline,
1,3,3,5-tetramethyl-6-methoxy-2-cyanomethylene-indoline,
1,3,3-trimethyl-5,7-dimethoxy-2-cyanomethylene-indoline,
1,3,3-trimethyl-5-ethoxy-2-cyanomethylene-indoline,
1,3,3-trimethyl-5-chloro-2-cyanomethylene-indoline,
1,3,3-trimethyl-5-phenyl-2-cyanomethylene-indoline,
1,3,3-trimethyl-5-methoxycarbonyl-2-cyanomethylene-indoline,
1,3,3-trimethyl-4,5-benzo-2-cyanomethylene-indoline,
1,3,3-trimethyl-5-dimethylamino-2-cyanomethylene-indoline,
1,3,3-triethyl-2-cyanomethylene-indoline,
1,3,3-trimethyl-2-ethoxycarbonylmethylene-indoline,
1,3,3-trimethyl-5-methoxy-2-ethoxycarbonylmethylene-indoline,
1,3,3,5-tetramethyl-2-ethoxycarbonylmethylene-indoline,
1,3,3-trimethyl-5-chloro-2-methoxycarbonylmethylene-indoline,
1,3,3-trimethyl-2-acetylmethylene-indoline,
1,3,3-trimethyl-2-benzoylmethylene-indoline,
1-methyl-2-cyanomethylene-dihydroquinoline,
1-methyl-6-chloro-2-cyanomethylene-dihydroquinoline,
1-methyl-5,6-benzo-2-cyanomethylene-dihydroquinoline,
1-methyl-2-ethoxycarbonylmethylene-dihydroquinoline,
1-methyl-2-benzoylmethylene-dihydroquinoline, and the corresponding 1-ethyl, -propyl, -isopropyl, -butyl, -isobutyl, -amyl, -isoamyl and so on up to -octyl compounds, for instance, 1-ethyl-, 1-propyl-, 1-isopropyl- and so on -3,3-dimethyl-5-methoxy-2-cyano-methylene-indoline and so on.

Suitable Friedel-Crafts catalysts are for example concentrated sulfuric acid, perchloric acid, hydrogen chloride, aluminum chloride, boron fluoride, iron chloride, antimony pentachloride and tin tetrachloride.

In some cases, the reaction takes place at a temperature as low as room temperature. In other cases it may be advantageous to raise the temperature to about 80–150° C.

Suitable solvents are those compounds which under the experimental conditions are inert to the acylating agent or react with it only slowly. Such solvents are, for example, carbon disulfide, chlorobenzene, dichlorobenzene and benzene.

The products obtainable according to the process described herein are distinguished by a relatively high absorption of ultra-violet rays. In the following table there are given the maxima of the light absorption of the products of the following examples related to the wavelengths ($\lambda$ max.) and the maxima of the absorption factors at said wavelengths ($\epsilon$ max.):

| | | |
|---|---|---|
| 1,3,3-trimethyl-2-dicyanomethylene-indoline (described hereinafter in Example 1). | $\lambda$ max.: 330 millimicrons. | $\epsilon$ max.: $2.5 \times 10^4$ liters/mol-cm. |
| 1,3,3,5-tetramethyl-2-dicyanomethylene-indoline (described hereinafter in Example 2). | $\lambda$ max.: 333 millimicrons. | $\epsilon$ max.: $2.4 \times 10^4$ liters/mol-cm. |
| 1,3,3-trimethyl-5-methoxy-2-dicyano-methylene-indoline (described hereinafter in Example 3). | $\lambda$ max.: 340 millimicrons. | $\epsilon$ max.: $2.3 \times 10^4$ liters/mol-cm. |
| 1,3,3-trimethyl-5-methoxy-2-cyanoethoxycarbonyl methylene-indoline (described hereinafter in Example 4). | $\lambda$ max.: 350 millimicrons. | $\epsilon$ max.: $2.3 \times 10^4$ liters/mol-cm. |
| 1,3,3-trimethyl-2-cyano-ethoxy-carbonylmethylene indoline (described hereinafter in Example 5). | $\lambda$ max.: 340 millimicrons. | $\epsilon$ max.: $2.4 \times 10^4$ liters/mol-cm. |
| 1,3,3,5-tetramethyl-2-(cyano-acetyl)-methylene-indoline (described hereinafter in Example 6). | $\lambda$ max.: 360 millimicrons. | $\epsilon$ max.: $2.2 \times 10^4$ liters/mol-cm. |
| 1,3,3-trimethyl-2-(cyano-acetyl)-methylene-indoline (described hereinafter in Example 7). | $\lambda$ max.: 358 millimicrons. | $\epsilon$ max.: $2.3 \times 10^4$ liters/mol-cm. |
| 1,3,3-trimethyl-5-methoxy-2-(cyano-acetyl)-methylene-indoline (described hereinafter in Example 8). | $\lambda$ max.: 365 millimicrons. | $\epsilon$ max.: $2.1 \times 10^4$ liters/mol-cm. |

According to this property of the products they are suitable as light-stabilizers for plastic materials and lacquers containing plastic materials such as polyethylenes, polypropylenes, polyvinyl chloride, and vinyl chloride copolymers, cellulose esters, for instance cellulose acetates, cellulose butyrates and cellulose acetobutyrates, polyesters such as alkyd resins, polymerization products of unsaturated polyesters with, for instance, styrene, and polycarbonates, polyamides, etc.

As a rule good results are obtained with a content from about 0.1 to about 3 percent by weight of the products according to the invention in such plastic materials.

In the case of coatings or articles such as foils, sheets, and vessels of any kind, of transparent plastics, for instance of clear alkyd resin or cellulose ester coatings or of articles of cellulose esters or of polyesters, for example, polycarbonates, with such a content of the products according to the invention such coatings and articles may be used for protecting goods covered by them against damage by ultra-violet light. For example, foils or sheets of this kind may be used for covering commodities placed on display in shop windows.

In addition to their light-stabilizing effect, the products according to the invention are also suitable for stabilizing plastics of the kind mentioned above against oxidation, particularly at elevated temperatures.

The following examples are given for the purpose of illustrating the invention.

*Example 1*

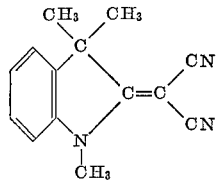

A mixture of 39.6 grams of 1,3,3-trimethyl-2-cyanomethylene-indoline,
24.6 grams of cyanogen chloride,
13.3 grams of aluminum chloride and
20 milliliters of benzene is slowly heated under a slight reflux while stirring from a temperature of 10° to 60° C. within about 180 minutes and to 85–90° C. within a further 180 minutes. Subsequently, the unreacted cyanogen chloride is distilled off. The residual reaction mixture, after cooling, is introduced into about 200 milliliters of dilute hydrochloric acid. The resulting crude dinitrile is filtered off with suction, washed and dried.

Yield: 30.0 grams. Melting point: 208–210° C.

After recrystallization from benzene with the addition of active carbon, colorless crystals of melting point 211° C. are obtained which fluoresce blue in ultraviolet light.

*Analysis.*—$C_{14}H_{13}N_3$. Molecular weight 223. Calculated: C, 75.3%; H, 5.87%; N, 18.83%. Found: C, 75.2%; H, 5.85%; N, 19.06%.

*Example 2*

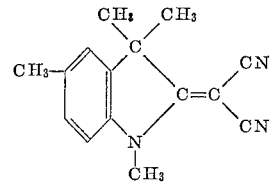

A mixture of 42.4 grams of 1,3,3,5 - tetramethyl - 2 - cyanomethylene-indoline,
24.6 grams of cyanogen chloride
13.3 grams of aluminum chloride and
20 milliliters of benzene is heated with stirring from 10° to 80° C. in the course of 250 minutes so that only a slight reflux takes place. Subsequently, the unreacted cyanogen chloride is distilled off and the residual reaction mixture, after cooling, introduced into about 350 milliliters of dilute hydrochloric acid. The resulting crude reaction product is filtered off with suction, washed and dried.

Yield: 33.7 grams. Melting point: 183–188° C.

After recrystallization from benzene with the addition of some active carbon, colorless crystals of melting point 189° C. are obtained which fluoresce blue in ultraviolet light.

*Analysis.*—$C_{15}H_{15}N_3$. Molecular weight 237. Calculated: C, 75.9%; H, 6.37%; N, 17.74%. Found: C, 76.0%; H, 6.38%; N, 17.79%.

*Example 3*

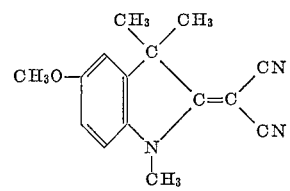

By reacting 22.8 grams of 1,3,3-trimethyl-5-methoxy-2-cyano-methylene-indoline
12.0 grams of cyanogen chloride and
6.0 grams of aluminum chloride as described in Example 2, there are obtained 17.1 grams of crude dinitrile of melting point 190–207° C. which, after recrystallization from acetonitrile, yield colorless crystals of melting point 211° C. which fluoresce blue in ultraviolet light.

*Analysis.*—$C_{15}H_{15}ON_3$. Molecular weight 253. Calculated: N, 16.60%; O, 6.33%. Found: N, 16.67%; O, 6.31%.

Example 4

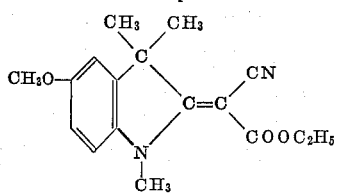

Into a mixture of 27.5 grams of 1,3,3-trimethyl-5-methoxy-2-ethoxycarbonylmethylene-indoline
12.0 grams of cyanogen chloride and
12 milliliters of benzene 13.3 grams of aluminum chloride are added at 5° C. with stirring and cooling. Subsequently, the mixture is slowly heated to 85° C. within about 100 minutes so that only a slight reflux takes place during that time. The unreacted cyanogen chloride is then distilled off and the brownish liquid residue introduced while stirring into a mixture of 250 milliliters of benzene and 350 milliliters of 2.2% hydrochloric acid. The benzene layer is separated off and shaken with 250 milliliters of 18.5% hydrochloric acid. After driving off the benzene, 18.7 grams of crude reaction product of melting point 134° C. remain behind. By recrystalliaztion from ligroin or methylcyclohexane with the addition of some active carbon, pale yellow-colored crystals are obtained which fluoresce blue in ultraviolet light.

Melting point: 135–136° C.

Analysis:—$C_{17}H_{20}O_3N_2$. Molecular weight 300. Calculated: C, 68.0%; H, 6.72%; N, 9.33%; O, 16.02%. Found: C, 67.8%; H, 6.81%; N, 9.38%; O, 16.13%.

Example 5

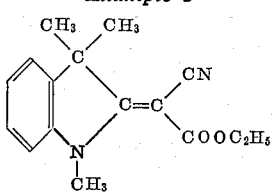

24.5 grams of 1,3,3-trimethyl-2-ethoxycarbonylmethylene-indoline
12.0 grams of cyanogen chloride, and
13.3 grams of aluminum chloride are reacted with one another as described in Example 4. 16.3 grams of reaction product of melting point 112–114° C. is obtained which, upon recrystallization from ligroin or methylcyclohexane with the addition of some active carbon, is recovered in the form of pale yellow-colored crystals that fluoresce blue in ultraviolet light.

Melting point: 115–116° C.

Analysis:—$C_{16}H_{18}O_2N_2$. Molecular weight 270. Calculated: C, 71.1%; H, 6.72%; N, 10.37%; O, 11.85%. Found: C, 71.4%; H, 6.85%; N, 10.40%; O, 11.84%.

Example 6

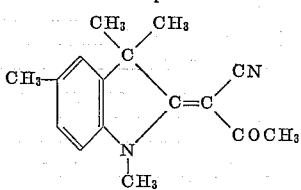

21.2 grams of 1,3,3,5,5-tetramethyl-2-cyanomethylene-iodoline
40.8 grams of acetic anhydride and
0.5 gram of concentrated sulfuric acid are heated together under reflux for 60 minutes. Subsequently, the unreacted acetic anhydride and the acetic acid formed are distilled off. The residual crude reaction product is then recrystallized from methylcyclohexane with the addition of some active carbon. Pale yellow-colored crystals of melting point 136° C. are thus obtained.

Yield: 17.5 grams.

Analysis:—$C_{16}H_{18}ON_2$. Molecular weight 254. Calculated: C, 75.6%; H, 7.13%; N, 11.03%; O, 6.30%. Found: C, 75.7%; H, 7.31%; N, 11.07%; O, 6.61%.

Example 7

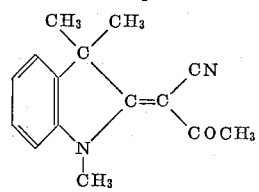

By reacting 19.8 grams of 1,3,3-trimethyl-2-cyanomethylene indoline
24.5 grams of acetic anhydride and
0.5 gram of concentrated sulfuric acid with one another in a manner analogous to that described in Example 6 and crystallizing the resulting crude product from methyl-cyclohexane with the addition of some active carbon, almost colorless crystals of melting point 132° C. are obtained.

Yield: 15.2 grams.

Analysis.—$C_{15}H_{16}ON_2$. Molecular weight 240. Calculated: C, 75.0%; H, 6.72%; N, 11.65%; O, 6.65%. Found: C, 74.9%; H, 6.81%; N, 11.71%; O, 6.91%.

Example 8

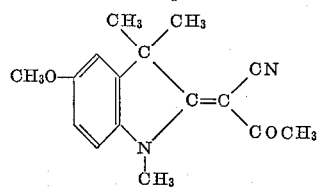

By reacting 22.8 grams of 1,3,3-trimethyl-5-methoxy-2-cyanomethylene-indoline
40.8 grams of acetic anhydride and
0.5 gram of concentrated sulfuric acid with one another in a manner similar to that described in Example 6 and crystallizing the resulting crude product from methylcyclohexane, ligroin or isopropanol with the addition of some active carbon, pale yellow-colored crystals are obtained which fluoresce blue in ultraviolet light and melt at 133–134° C.

Yield: 16.2 grams.

Analysis.—$C_{16}H_{28}O_2N_2$. Molecular weight 280. Calculated: C, 71.1%; H, 6.72%; N, 10.37%; O, 11.85%. Found: C, 71.2%; H, 6.76%; N, 10.50%; O, 11.87%.

Example 9

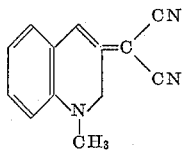

By reacting 15.5 grams of 1-methyl-2-cyanomethylene-dihydroquinoline
11.0 grams of cyanogen chloride and
12.0 grams of aluminum chloride with one another in a manner similar to that described in Example 4, and after distilling off the unreacted cyanogen chloride, a brown viscous reaction mixture is obtained. After cooling, this mixture is introduced into 300 millilters of 7.5 percent hydrochloric acid. The resulting crude dinitrile is taken up with chloroform. After concentrating the chloroform layer, it remains behind as a brownish-yellow powder. Yield: 12.8 grams. After recrystallization from acetonitrile, yellow crystals of melting point 263° C. are obtained.

*Analysis.*—$C_{13}H_9N_3$. Molecular weight 207. Calculated: C, 75.35%; H, 4.37%; N, 20.28%. Found: C, 75.28%; H, 4.59%; N, 20.05%.

Example 10

66 parts by weight of a 75 percent benzene solution of an alkyl resin with a content of 67 percent linseed oil are mixed with 24 parts benzine, 10 parts dipentane and 4 parts of a 25 percent solution of cobalt-lead-manganese naphthenate in benzine. To this composition 2 parts of 1,3,3-trimethyl-2-cyanoethoxycarbonyl-methylene indoline produced as described in Example 5 are added. A film produced from this composition is not discolored when exposed in a fadeometer for 500 hours. Also the adsorption of ultraviolet light by the film does not decrease after this time. A film produced from the same composition from which the indoline derivative was omitted is definitely discolored in this test.

The same effect is obtained with films deposited from similar compositions which contain instead of 1,3,3-trimethyl-2-cyanoethoxycarbonylmethyleneindoline, for instance, 1,3,3 - trimethyl - 5 - methoxy - 2 - cyanoethoxycarbonylmethyleneindoline produced as described in Example 4.

Example 11

A mixture of 70 parts by weight of granulated polyvinyl chloride, 10 parts by weight of dibutyl phthalate, 20 parts by weight of adipic acid benzyl octyl ester, 1 part by weight of diphenyl thiourea and 0.25 part by weight of 1,3,3-trimethyl-2-dicyano-methyleneindoline, obtained as described in Example 1, is treated at 165–170° C. for 8 to 10 minutes with a roll to produce a 0.3 mm. thick film. This film tested in a fadeometer for 500 hours is not discolored.

The same result is obtained when using the products described in Examples 2 to 9 instead of the product described in Example 1.

Example 12

At 160–170° C. a rough sheet is prepared from a mixture of 70 parts by weight of cellulose acetate having a degree of acetylation corresponding to 2.5 acetyl radicals per glucose unit of the cellulose, 30 parts by weight of phthalic acid ethylene glycol ester and 0.4 part by weight of 1,3,3-trimethyl-2-cyanoacetylmethyleneindoline produced as described in Example 7. The sheet is hot pressed to a 1 mm. thick plate which absorbs ultraviolet light. This absorption does not decrease when the plate is exposed in a fadeometer for 500 hours.

The same result is obtained with corresponding plates containing the products described in Examples 1–6 and 8–9.

Example 13

A 100 micron thick film produced from cellulose acetobutyrate containing 1 percent of 1,3,3-trimethyl-2-dicyano-methylene indoline is treated for 32 days in a stream of oxygen at 100° C. The film is unchanged. A film of cellulose acetobutyrate without the indoline derivative, however, is attacked by this treatment as early as 8 days in such a manner that its viscosity in solution is decreased 50 percent.

Example 14

A film produced from a high molecular weight polycarbonate of bisphenol A (2,2-bis(p-hydroxyphenol)propane) containing 1 percent of 1,3,3-trimethyl-5-methoxy-2-dicyano-methylene indoline is exposed in the Xenon test for 1000 hours. After this treatment the film is not discolored. On the other hand, a similar polycarbonate film containing no light-stabilizer is definitely discolored after this test.

I claim:

1. A process for the production of a derivative of a heterocyclic methylene base having the formula

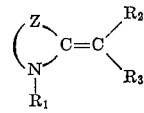

in which $R_1$ is an alkyl radical containing up to 8 carbon atoms, $R_2$ and $R_3$ are each a radical of the group consisting of cyano, acetyl, propionyl, butyryl, isobutyryl, benzoyl, methoxycarbonyl, ethoxycarbonyl, and phenoxycarbonyl radicals, and the ring consisting of $R_1$, Z, C, and N is a ring of the group consisting of lower alkyl-substituted indolines and dihydroquinolines which comprises heating together at a temperature up to about 150° C., (a) a monoacyl derivative of a heterocyclic methylene base having the formula:

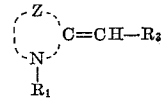

in which each of the symbols have the foregoing significance, and (b) an acylating agent of the group consisting of cyanogen chloride, acetic, propionic, butyric, isobutyric, and benzoic acid anhydrides and chlorides, and the methyl, ethyl, and phenyl esters of chlorocarbonic acid, in the presence of a catalyst of the group consisting of sulfuric acid, perchloric acid, hydrogen chloride, aluminum chloride, boron trifluoride, ferric chloride, antimony pentachloride and stannic tetrachloride.

2. A process as defined in claim 1 in which the reaction is carried out in the presence of an inert solvent.

3. A process as defined in claim 2 in which the solvent is selected from the group consisting of carbon disulfide, chlorobenzene, dichlorobenzene and benzene.

References Cited in the file of this patent

UNITED STATES PATENTS

| | | |
|---|---|---|
| 2,341,357 | Brooker et al. | Feb. 8, 1944 |
| 2,438,704 | Kendall et al. | Mar. 30, 1948 |
| 2,557,806 | Van de Straete et al. | June 19, 1951 |
| 2,592,370 | Zwilgmeyer | Apr. 8, 1952 |
| 2,600,380 | Edwards | June 17, 1952 |
| 2,614,940 | Freyermuth et al. | Oct. 21, 1952 |
| 2,882,158 | Brooker et al. | Apr. 14, 1959 |
| 2,957,005 | Coenen et al. | Oct. 18, 1960 |
| 2,979,501 | Fry et al. | Apr. 11, 1961 |
| 2,984,663 | Fry et al. | May 16, 1961 |

OTHER REFERENCES

Coenen et al.: Zeitschrift für Elektrochemie, vol. 57, No. 9, pp. 785–795.